United States Patent
Ishikawa et al.

(10) Patent No.: US 8,355,626 B2
(45) Date of Patent: Jan. 15, 2013

(54) LENS-INTERCHANGEABLE CAMERA PERFORMING FOCUS CONTROL, LENS BARREL, AND PROGRAM

(75) Inventors: Masanori Ishikawa, Saitama (JP); Masahisa Tamura, Utsunomiya (JP); Tadanori Okada, Utsunomiya (JP); Takumi Yamanaka, Utsunomiya (JP); Kunihiko Sasaki, Utsunomiya (JP); Yasushi Murakami, Utsunomiya (JP); Shota Shimada, Tokyo (JP); Takeya Nakayama, Utsunomiya (JP)

(73) Assignee: Canon Kabushiki Kaisha (JP)

(*) Notice: Subject to any disclaimer, the term of this patent is extended or adjusted under 35 U.S.C. 154(b) by 0 days.

(21) Appl. No.: 13/109,378

(22) Filed: May 17, 2011

(65) Prior Publication Data

US 2011/0286733 A1 Nov. 24, 2011

(30) Foreign Application Priority Data

May 18, 2010 (JP) .................. 2010-113841

(51) Int. Cl.
*G03B 13/22* (2006.01)
(52) U.S. Cl. .......................... 396/91; 396/93
(58) Field of Classification Search ............. 396/89–91, 396/93, 102, 104, 125, 128, 133
See application file for complete search history.

(56) References Cited

U.S. PATENT DOCUMENTS

2003/0012568 A1* 1/2003 Ishikawa et al. ............. 396/104

FOREIGN PATENT DOCUMENTS

JP 5-072468 A 3/1993

* cited by examiner

*Primary Examiner* — W. B. Perkey
*Assistant Examiner* — Minh Phan
(74) *Attorney, Agent, or Firm* — Rossi, Kimms & McDowell LLP

(57) ABSTRACT

A lens-interchangeable camera includes a focus detector performing focus detection and a controller performing a drive control of a lens based on a defocus amount. The controller finishes focusing operation without driving the lens when the defocus amount is out a range of a first in-focus determination width, and performs the focusing operation when the defocus amount is out a range of the first in-focus determination width. The controller finishes the focusing operation without performing the focus detection again after completing the drive when the defocus amount is out a range of a second in-focus determination width, and performs the focus detection again after completing the drive when the defocus amount is out a range of the second in-focus determination width. The second in-focus determination width is set to be greater than the first in-focus determination width and be greater than or equal to a drive limit value.

5 Claims, 6 Drawing Sheets

|  | AF SENSITIVITY ERROR > $\alpha 1$ | AF SENSITIVITY ERROR ≤ $\alpha 1$ |
| --- | --- | --- |
| DRIVE LIMIT VALUE > $\alpha 2$ | SECOND IN-FOCUS DETERMINATION WIDTH $\beta 1$ | SECOND IN-FOCUS DETERMINATION WIDTH $\beta 1$ |
| DRIVE LIMIT VALUE ≤ $\alpha 2$ | SECOND IN-FOCUS DETERMINATION WIDTH $\beta 2$ | SECOND IN-FOCUS DETERMINATION WIDTH $\beta 1$ |

FIG. 4

LENS-INTERCHANGEABLE CAMERA PERFORMING FOCUS CONTROL, LENS BARREL, AND PROGRAM

BACKGROUND OF THE INVENTION

1. Field of the Invention

The present invention relates to a lens-interchangeable camera.

2. Description of the Related Art

When a defocus amount detected by performing focus detection is in a range of a predetermined in-focus determination width (a clearance in-focus determination width) during a focusing operation of a camera, a focus control may be finished without performing the focal detection again after completing the drive of the lens. The clearance in-focus determination width is set to be able to reduce the generation of a so-called hunting phenomenon of the lens. Previously, the clearance in-focus determination width has been determined uniformly in accordance with a depth of focus. Japanese Patent Laid-Open No. H05-072468 discloses a clearance in-focus determination width that is changed between a silver salt camera and a digital camera in order to optimize it.

However, in the conventional art, it is difficult to reduce the generation of the hunting phenomenon while improving focusing precision because the clearance in-focus determination width is set to a constant value without depending on the property of the lens.

SUMMARY OF THE INVENTION

The present invention provides a lens-interchangeable camera that is capable of setting a clearance in-focus determination width which is optimal for each lens and that balances the improvement of the focusing precision and the reduction of the hunting generation to perform the focus control.

A lens-interchangeable camera as one aspect of the present invention includes a focus detector configured to perform focus detection, and a controller configured to perform a drive control of a lens based on a defocus amount detected by the focus detector. The controller finishes focusing operation without driving the lens when the defocus amount is less than or equal to a first in-focus determination width of the lens, and performs the focusing operation when the defocus amount is out a range of the first in-focus determination width. The controller finishes the focusing operation without performing the focus detection again after completing the drive of the lens when the defocus amount is in a range of a second in-focus determination width of the lens, and performs the focus detection again after completing the drive of the lens when the defocus amount is out a range of the second in-focus determination width. The second in-focus determination width is set so as to be greater than the first in-focus determination width and to be greater than or equal to a drive limit value of the lens based on information obtained from the lens.

A lens barrel another aspect of the present invention is configured to be interchangeably mounted on the lens-interchangeable camera.

A program as another aspect of the present invention is executed by a computer including the steps of calculating a defocus amount obtained by performing focus detection, selecting one of finishing a focusing operation without driving the lens when the defocus amount is in a range of a first in-focus determination width or performing the focusing operation when the defocus amount is out a range of the first in-focus determination width, setting a second in-focus determination width so as to be greater than the first in-focus determination width and to be greater than or equal to a drive limit value of the lens based on information obtained from the lens, and selecting one of finishing the focusing operation without performing the focus detection again after completing the drive of the lens when the defocus amount is in a range of the second in-focus determination width of the lens or performing the focus detection again after completing the drive of the lens when the defocus amount is out a range of the second in-focus determination width.

Further features and aspects of the present invention will become apparent from the following description of exemplary embodiments with reference to the attached drawings.

BRIEF DESCRIPTION OF THE DRAWINGS

FIG. 4 is a matrix table that is used for determining a second in-focus determination width in Embodiment 2.

DESCRIPTION OF THE PREFERRED EMBODIMENTS

Figure 1:
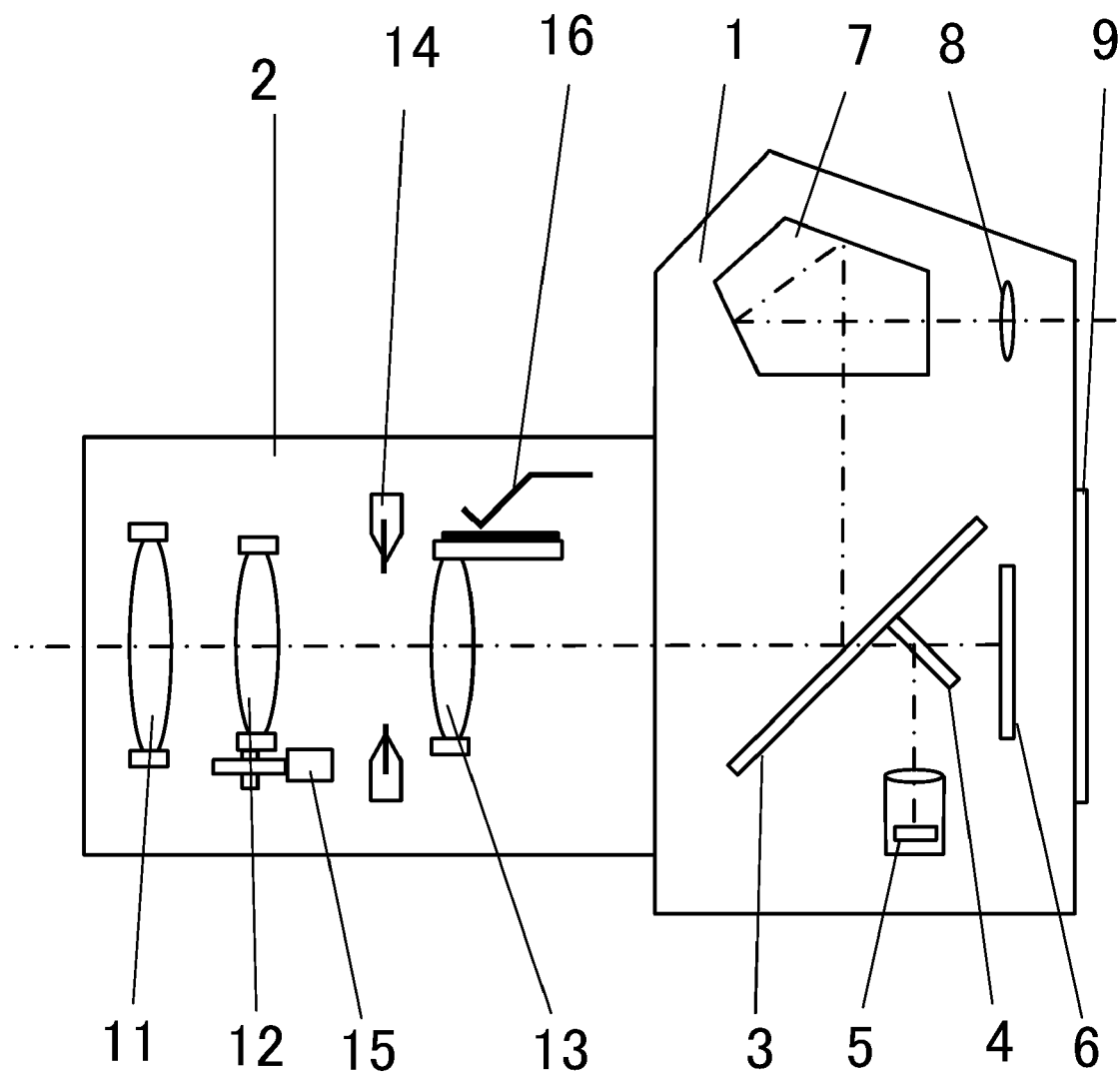
FIG. 1 is a cross-sectional diagram illustrating a camera system in Embodiment 1.

Exemplary embodiments of the present invention will be described below with reference to the accompanied drawings. In each of the drawings, the same elements will be denoted by the same reference numerals and the duplicate descriptions thereof will be omitted.

Embodiment 1

First of all, a configuration of a lens-interchangeable camera system (an image pickup apparatus) in Embodiment 1 will be described. FIG. 1 is a cross-sectional diagram of the camera system in the present embodiment. Reference numeral 1 denotes a camera body (a lens-interchangeable camera), and reference numeral 2 denotes an interchangeable lens (a lens barrel) that is mounted on the camera body 1.

The camera body 1 is configured by each of the following members. Reference numeral 3 denotes a mirror. The mirror 3 is disposed on an optical axis of a light passing through the interchangeable lens 2 before the camera system starts taking an image, and divides the light into a part of the light that is introduced to a finder optical system and the other part of the light that is introduced to a focus detector 5 using a sub-mirror 4. The mirror 3 is configured so as to be evacuated from the optical axis during taking the image. Reference numeral 5 denotes a focus detector. The focus detector 5 is an AF sensor of a phase difference type, and is configured by a condenser lens that divides an incident light into two lights, two separator lenses that image the lights again, and a line sensor such as a CCD that performs a photoelectric conversion of an object image which has been imaged. Reference numeral 6 denotes an image pickup element (a semiconductor image-pickup unit). The image pickup element 6 is for example a CMOS or a CCD that performs a photoelectric conversion of the object image which is obtained by imaging the light passing through the lens 2 during taking the image. Reference numeral 7 denotes a pentaprism, and reference numeral 8 denotes a finder optical unit, and the pentaprism 7 and the finder optical unit 8 constitute the finder optical system. Reference numeral 9 denotes a liquid crystal display unit that displays an image on the image pickup element 6.

The interchangeable lens 2 is configured by each of the following members. Reference numeral 11 denotes a first lens unit, reference numeral 12 denotes a second lens unit that is a focusing optical system, and reference numeral 13 denotes a third lens unit that is a zooming optical system. An amount of light (image pickup light) passing through the first lens unit 11, the second lens unit 12, and the third lens unit 13 is limited by an aperture stop 14. The second lens unit 12 that is the focusing optical system moves on an optical axis by receiving a driving force from an AF drive motor 15 to perform a focusing operation by stopping at a predetermined focal position. The third lens unit 13 that is the zooming optical system is driven in an optical axis direction so that an operation force obtained by a transmission mechanism (not shown) that transmits an operation by a user is converted into a drive in the optical axis direction to perform the zooming operation. The zooming operation is detected by a zoom encoder 16. The zoom encoder 16 is con figured by a substrate on which a zone pattern that divides a zoom area into a plurality of areas and a brush that electrically contacts on the substrate for recognizing the zone.

Figure 2:
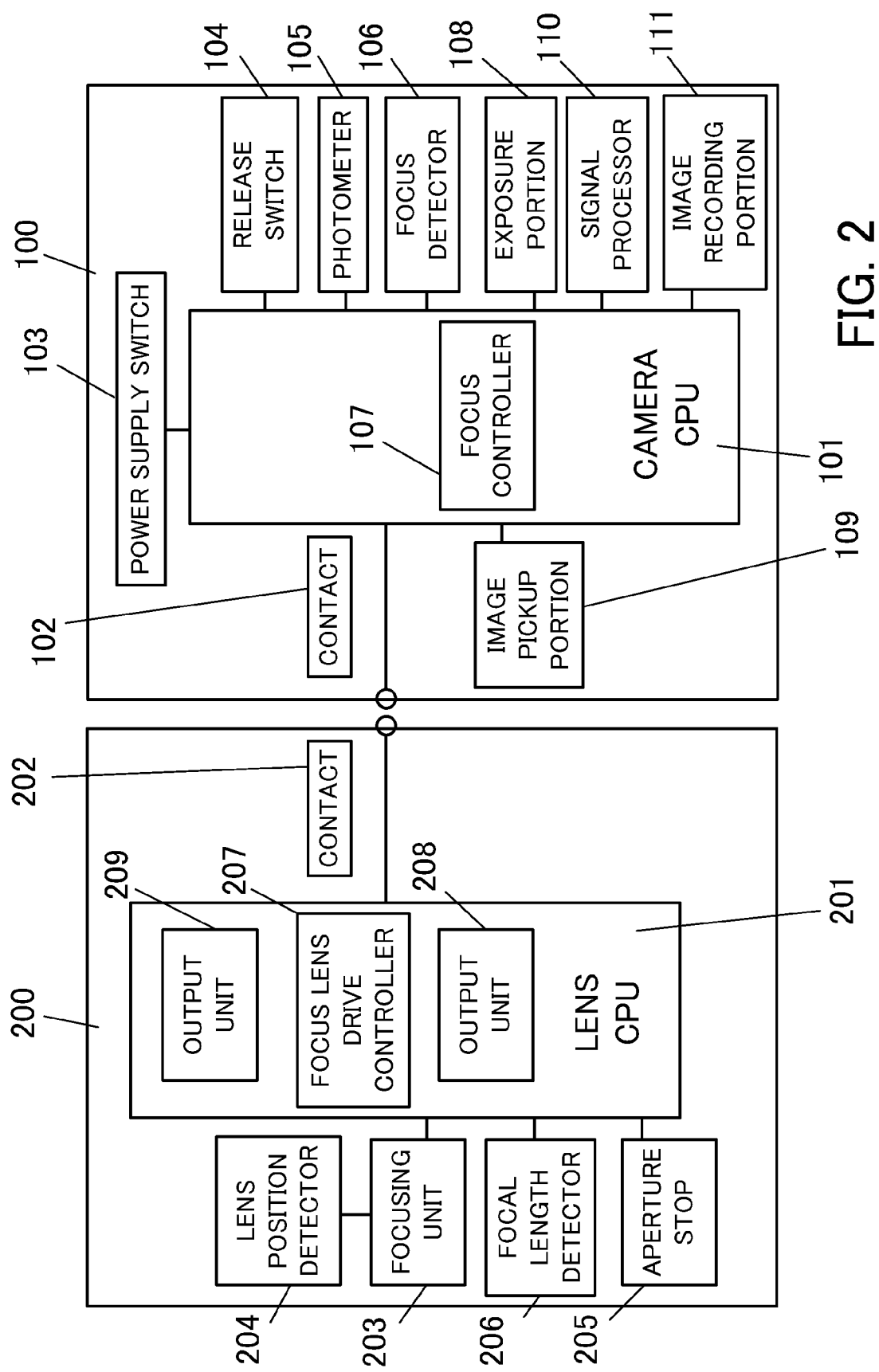
FIG. 2 is a block diagram of the camera system in Embodiment 1.

FIG. 2 is a block diagram of a lens-interchangeable digital single-lens reflex camera system (an image pickup apparatus) in the present embodiment. In FIG. 2, reference numeral 100 denotes a digital camera body, and reference numeral 200 denotes an interchangeable lens body.

Reference numeral 101 denotes a camera CPU (a controller) that is configured by a microcomputer. The camera CPU 101, as described below, controls operations of various kinds of apparatuses in the camera body 100, and also receives and transmits signals for the lens CPU 201 via a camera contact 102 when the lens body 200 is mounted. As information to be transmitted, for example driving information of the focus lens based on focus detection information described below is contained. As a signal received from the side of the lens body 200, AF sensitivity constant information, AF sensitivity error information, lens drive limit information, and the like are contained. The camera contact 102 is configured by including a signal transmission contact that transmits a signal to the side of the lens body 200 and a power supply contact that supplies a power to the side of the lens body 200.

Reference numeral 103 denotes a power supply switch that is operable at the outside of the camera body 100. The power supply switch 103 is a switch that turns on the camera CPU 101 to supply the power to each of an actuator, a sensor, and the like in a system to be in a state where the system is operable. Reference numeral 104 denotes a two-step stroke release switch that is operable at the outside of the lens body 200. A signal from the release switch 104 is inputted to the camera CPU 101. The camera CPU 101 operates in accordance with the signal inputted from the release switch 104, and an exposure amount is determined by a photometer 105 when a first stroke switch SW1 is ON. At the same time, focus detection of an object that exists in a focus detection area is performed by a focus detector 106 that is configured by an AF sensor to perform focus detection, and defocus information is transmitted to the camera CPU 101.

An output of the focus detector 106 is inputted to the camera CPU 101, and also AF sensitivity constant information, AF sensitivity error information, and lens drive limit information described blow are inputted from the side of the lens body 200 to the camera CPU 101. A focus controller 107 in the camera CPU 101 performs a drive control of the lens based on a defocus amount detected by the focus detector 106. In the present embodiment, the focus controller 107 compares a first in-focus determination width previously stored with a defocus amount obtained from the output of the focus detector 106. When the defocus amount is in a range of the first in-focus determination width of the lens, the focus controller 107 determines that it is in an in-focus state and the focusing operation is finished without outputting a lens drive command, i.e. without driving the lens. On the other hand, when the defocus amount is out a range of the first in-focus determination width, the focus controller 107 determines that it is in an out-of-focus state and the lens drive command is outputted to perform the focusing operation. In accordance with the lens drive command, the lens drive is performed by calculating a lens drive amount based on the defocus amount and the AF sensitivity constant to transmit the lens drive amount to the lens CPU 201.

The focus controller 107 also selects a second in-focus determination width (a clearance in-focus determination width) based on the first in-focus determination width, the AF sensitivity error information, and the lens drive limit information. As the second in-focus determination width, a value that is less than a value obtained by dividing the first in-focus determination width by the AF sensitivity error is selected. For example, when the AF sensitivity error of 50% is generated, a value that is less than twice as large as the first in-focus determination width is selected. However, when the second in-focus determination width obtained based on the AF sensitivity error is less than a lens drive limit, the lens drive limit is set as the second in-focus determination width. In the present embodiment, it is preferable that the second in-focus determination width is set (selected) so as to be greater than the first in-focus determination width and also to be greater than or equal to a drive limit value of the lens based on the information obtained from the lens.

When the lens drive is performed based on the comparison result of the defocus amount and the first in-focus determination width, subsequently the defocus amount is compared with the second in-focus determination width. As a result, when the defocus amount is in a range of the second in-focus determination width of the lens, the focusing operation is finished without performing the focus detection again after the drive of the lens is completed. On the other hand, when the defocus amount is out a range of the second in-focus determination width, the focus detection is performed again after the drive of the lens is completed.

When the operation continues until a second stroke switch SW2 is turned ON, an aperture stop operation command described below is transmitted to the lens CPU 201 in the lens body 200. At the same time, an exposure preparing start signal is transmitted to perform a mirror-up operation, and an exposure start command is transmitted to an exposure portion 108 (a shutter) to open the shutter after an exposure preparing end signal from the camera or the lens. An image pickup portion 109 performs a photoelectric conversion of an object image that is obtained by passing through an imaging optical system to be imaged, and a signal processor 110 outputs an image signal for which a digital conversion has been performed. The image signal (the image data) is recorded or stored in a recording medium such as a semiconductor memory, for example a flash memory, a magnetic disk, or an optical disk in an image recording portion 111.

Reference numeral 202 denotes a lens contact, which is configured by including a signal transmission contact to which a signal is transmitted from the side of the camera body 100 and a power supply contact to which a power is supplied from the side of the camera body 100. Reference numeral 203 denotes a focusing unit. The focusing unit 203 is configured by including a focusing drive unit controlled by a focusing lens drive controller 207 in the lens CPU 201 and a focus lens driven by the focusing drive unit. Reference numeral 204 denotes a lens position detector. The lens position detector 204 detects a position of the focus lens and monitors whether the lens is driven in accordance with the lens drive command.

Reference numeral 205 denotes an aperture stop, which corresponds to the aperture stop 14 in FIG. 1. The aperture stop 205 is, as described above, configured by including an aperture stop drive unit that is controlled by the lens CPU 201 in accordance with an aperture stop operation command transmitted from the camera CPU 101 and an aperture stop portion that is driven by the aperture stop drive unit to determine an opening area. Reference numeral 206 denotes a focal length detector. The focal length detector 206 is configured by including a zoom detector that detects a position of a zoom lens, which corresponds to the zoom encoder 16 in FIG. 1, and it transmits the focal length to the lens CPU 201. Reference numeral 207 denotes a focus lens drive controller. The focus lens drive controller 207 performs a drive control of the focusing unit 203 in accordance with a drive command from the focusing controller 107 in the camera CPU 101 described above.

Reference numeral 208 denotes an output portion that outputs the AF sensitivity constant information and the AF sensitivity error information. The output portion 208 determines the AF sensitivity constant and the AF sensitivity error that are set in a focal length zone obtained from the focal length information detected by the focal length detector 206 to output them to the side of the camera body 100. In the embodiment, the AF sensitivity error is error information by a detection resolution of the focal length detector 206. For example, information on what percentage of the AF sensitivity constant changes in a width of the detected focal length zone is transmitted. Reference numeral 209 denotes an output portion that outputs lens drive limit information. The output portion 209 transmits information of a drive amount that is a limit to prevent the hunting, which is determined in accordance with an accuracy of the drive stop of the focus lens, to the side of the camera body 100.

Figure 3:
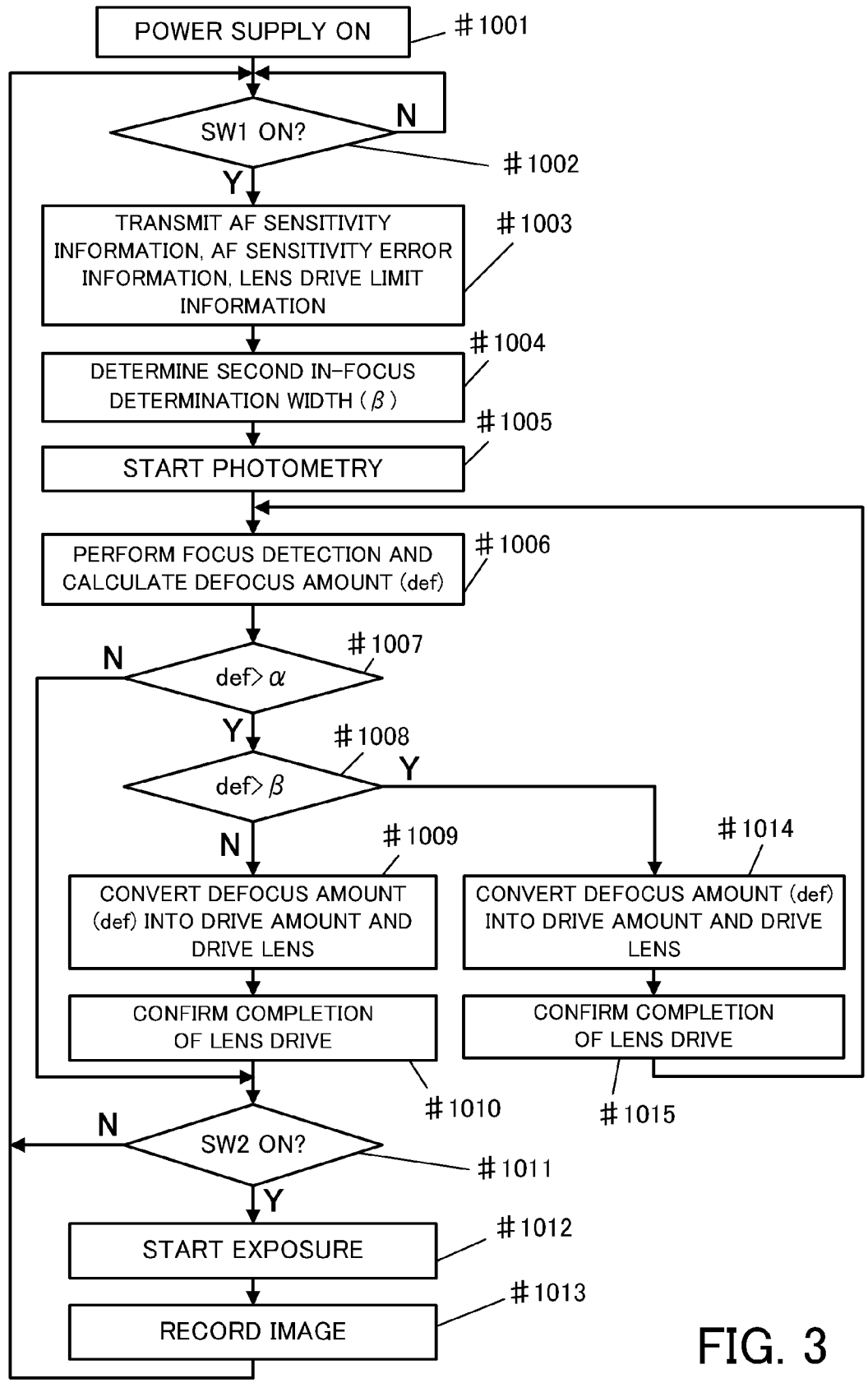
FIG. 3 is a flowchart illustrating a main operation of the camera system in Embodiment 1.

FIG. 3 is a flowchart illustrating a main operation by the camera system in FIG. 2. The flowchart of FIG. 3 is performed based on an instruction of the camera CPU 101. First of all, when the power supply switch 103 of the camera body 100 is turned on, a power supply to the lens body 200 is started. When a fresh battery is installed or the lens body 200 is mounted on the camera body 100, a communication between the camera body 100 and the lens body 200 starts (Step #1001). Next, the camera CPU 101 determines whether or not the signal of the first stroke switch SW1 is generated by the release switch 104 (Step #1002). When this signal is generated, the AF sensitivity information, the AF sensitivity error information, and the lens drive limit information are communicated from the lens CPU 201 to the side of the camera body 100 (Step #1003).

Next, the second in-focus determination width β for determining whether or not the focus detection is performed again after driving the lens is determined. As the second in-focus determination width β, specifically, a value that is less than a value obtained by dividing the first in-focus determination width α set as a reference in the camera CPU 101 by the AF sensitivity error is selected. For example, when the AF sensitivity error of 50% is generated, a value that is less than twice as large as the first in-focus determination width a is selected.

Next, the lens drive limit information communicated by the lens CPU 201 is compared with the second in-focus determination width β. As a result of the comparison, when the second in-focus determination width β is greater than or equal to the lens drive limit information (the drive limit value), an unchanged value of the second in-focus determination width β is used. On the other hand, when the second in-focus determination width β is less than the drive limit value, the value of the second in-focus determination width β is replaced with the drive limit value (Step #1004). In accordance with such a setting, the second in-focus determination width β (the clearance in-focus determination width) is set so as to be greater than the limit where the hunting of the lens does not occur.

Next, in Step #1005, performing the photometry starts. In Step #1006, the focus detection is performed to calculate a defocus amount def. Then, in Step #1007, the defocus amount def calculated in Step #1006 is compared with the first in-focus determination width α. When the defocus amount def is in the first in-focus determination width α, the AF operation is finished since it is in the in-focus state and then the flow proceeds to Step #1011. On the other hand, when the defocus amount def is out of the first in-focus determination width α, it is in the out-of-focus state and the flow proceeds to Step #1008.

In Step #1008, the defocus amount def calculated before the drive of the lens starts is compared with the second in-focus determination width β. When the defocus amount def is within the second in-focus determination width β, the flow proceeds to Step #1009. On the other hand, when the defocus amount def is out of the second in-focus determination width β, the flow proceeds to Step #1014. In Step #1009, the calculated defocus amount def is converted into an amount of advance of the lens, and the converted value is transmitted to the focus lens drive controller 207 at the side of the lens body 200 to drive the lens. In Step #1010, a drive amount of the lens is detected, and whether the lens is driven by the calculated value in Step #1009 is confirmed. When it is confirmed that the lens is driven by the calculated value, the drive of the lens is stopped.

In Step #1011, Step #1002 to Step #1011 are circulated to stand by until the second stroke switch SW2 is turned on by a full-push operation of the release switch 104. When the second stroke switch SW2 is turned on, the flow proceeds to Step #1012. In Step #1012, the exposure start command is outputted after finishing the exposure preparation such as a mirror-up operation, and the shutter is opened to perform the exposure operation. In Step #1013, the image obtained by the exposure is recorded, and the flow proceeds to Step #1002.

In Step #1014, similarly to Step #1009, the calculated defocus amount def is converted into the amount of advance of the lens based on the AF sensitivity information transmitted from the lens CPU 201. Then, the converted value is transmitted to the focus lens drive controller 207 at the side of the lens body 200, and the focus lens is driven. In Step #1015, a drive amount of the focus lens is detected. Then, whether the lens is driven by the calculated value in Step #1014 is confirmed, and the drive of the lens is stopped when it is confirmed that the lens is driven by the calculated value. After that, the flow proceeds to Step #1006 to perform the focus detection again.

In the lens-interchangeable camera system (the image pickup apparatus) in the present embodiment, series of operations described above are repeated until the power supply switch 103 is turned off. When the power supply switch 103 is turned off, the communication between the camera CPU 101 and the lens CPU 201 is finished, and the power supply to the lens body 200 is finished.

Embodiment 2

Next, a camera system in Embodiment 2 of the present invention will be described. The second in-focus determination width $\beta$ in the camera system of the present embodiment is determined by the camera CPU 101 based on a matrix table of AF sensitivity error information and lens drive limit information obtained from the side of the lens body 200.

FIG. 4 is a matrix table for determining the second in-focus determination width $\beta$ in the present embodiment. As illustrated in the matrix table of FIG. 4, the AF sensitivity error information (the AF sensitivity error) and the lens drive limit information (the drive limit) are compared with a first predetermined value $\alpha 1$ and a second predetermined value $\alpha 2$, respectively. As described below, the comparison result is divided into four cases in accordance with the range of the information, and the second in-focus determination width (a first value $\beta 1$ or a second value $\beta 2$) is determined in accordance with each case. Specifically, when the AF sensitivity error is greater than the first predetermined value $\alpha 1$ and the drive limit value is less than or equal to the second predetermined value $\alpha 2$ (a first range), the second in-focus determination width is set to the second value $\beta 2$. When the AF sensitivity error is greater than the first predetermined value $\alpha 1$ and the drive limit value is greater than the second predetermined value $\alpha 2$ (a second range), the second in-focus determination width is set to the first value $\beta 1$. When the AF sensitivity error is less than or equal to the first predetermined value $\alpha 1$ and the drive limit value is less than or equal to the second predetermined value $\alpha 2$ (a third range), the second in-focus determination width is set to the first value $\beta 1$. When the AF sensitivity error is less than or equal to the first predetermined value $\alpha 1$ and the drive limit value is greater than the second predetermined value $\alpha 2$ (a fourth range), the second in-focus determination width is set to the first value $\beta 1$.

Symbol $\beta 1$ is the second in-focus determination width which is commonly set. The second value $\beta 2$ is a value that is less than the first value $\beta 1$, which is the second in-focus determination width which is set in a case where the AF sensitivity error is large and the drive limit is small. Symbol $\alpha 1$ is the AF sensitivity error of the limit of changing from the second in-focus determination width $\beta 1$ commonly set to the first in-focus determination width. Symbol $\alpha 2$ is the lens drive limit value in which the hunting does not occur when the second in-focus determination width is set to $\beta 2$.

In the first range, since the AF sensitivity error is greater than the first predetermined value $\alpha 1$, it is preferable that the second in-focus determination width is shortened to reduce a focusing error. On the other hand, since the drive limit is less than or equal to the second predetermined value $\alpha 2$, the drive is possible and therefore the second in-focus determination width $\beta 2$ that is less than the common second in-focus determination width $\beta 1$ is selected. In the second range, since the AF sensitivity error is greater than the first predetermined value $\alpha 1$, it is preferable that the second in-focus determination width is shortened to reduce the focusing error. On the other hand, since the drive limit is greater than the second predetermined value $\alpha 2$, there is a problem in the drive and therefore the common second in-focus determination width $\beta 1$ is selected, instead of selecting the second in-focus determination width $\beta 2$ that is less than the common width. In the third and fourth ranges, since the AF sensitivity error is less than the first predetermined value $\alpha 1$, it is not necessary to shorten the second in-focus determination width to reduce the focusing error. Therefore, whether the drive limit is large or small, the common second in-focus determination width $\beta 1$ is selected instead of selecting the second in-focus determination width $\beta 2$ that is less than the common width.

The present embodiment may set the second in-focus determination width only by using the drive limit value of the lens. In this case, when the drive limit value is greater than the second predetermined value $\alpha 2$, the second in-focus determination width is set to the first value $\beta 1$. On the other hand, when the drive limit value is less than or equal to the second predetermined value $\alpha 2$, the second in-focus determination width is set to the second value $\beta 2$ that is less than the first value $\beta 1$.

As described above, according to the present embodiment, the second in-focus determination width which is appropriate is selected in accordance with the AF sensitivity error and the drive limit.

Embodiment 3

Next, a camera system in Embodiment 3 of the present invention will be described. In the embodiment, property information of each lens (AF sensitivity error information, lens drive limit information) is stored in the camera CPU. The property information of the lens is selectively read out based on identification information (ID information) and focal length information of the lens mounted on the camera body to determine the second in-focus determination width.

Figure 5:
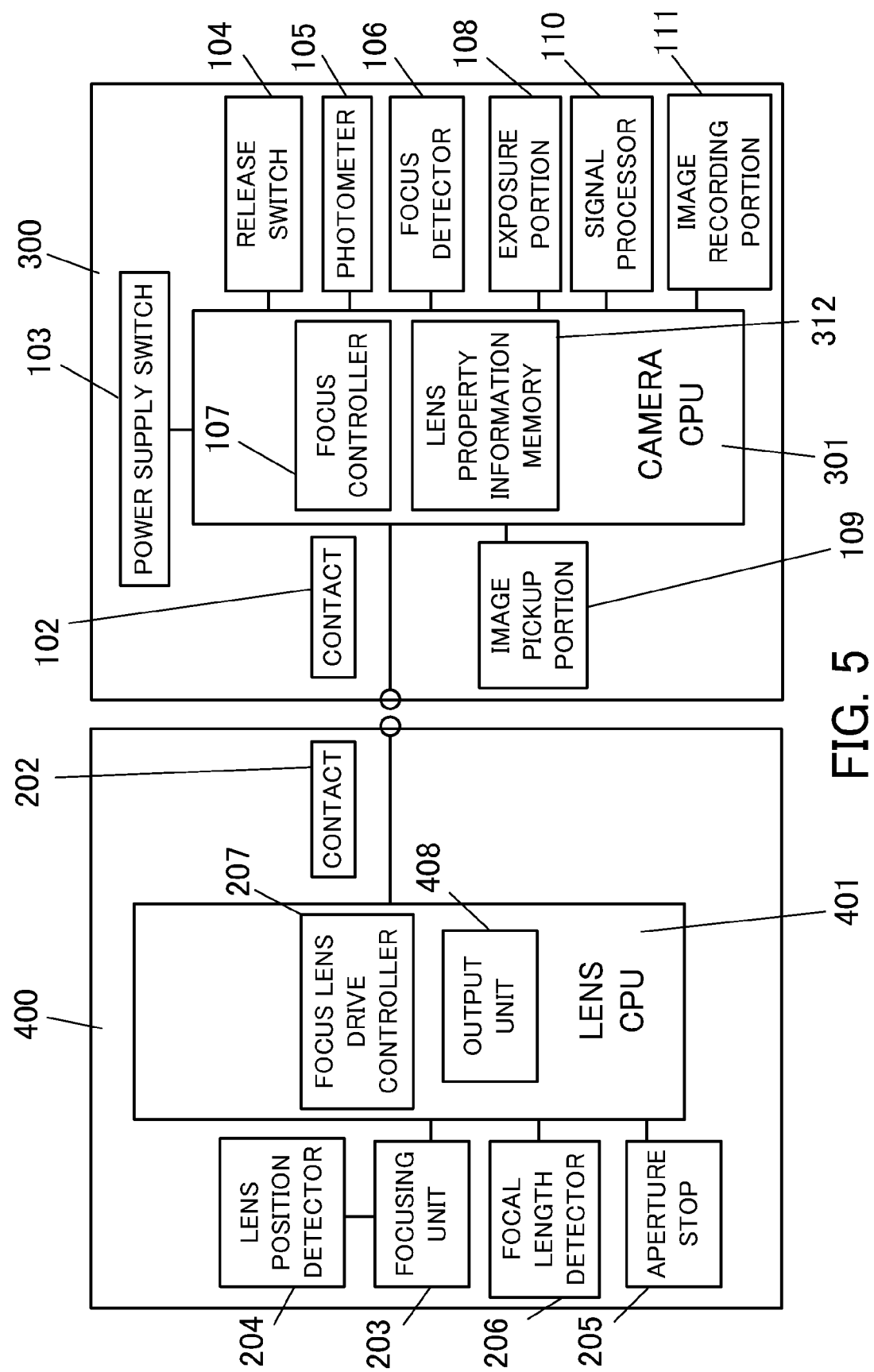
FIG. 5 is a block diagram of a camera system in Embodiment 3.

FIG. 5 is a block diagram of a lens-interchangeable digital single-lens reflex camera system in the present embodiment. The camera system of the present embodiment is configured by including a camera body 300 (a lens-interchangeable camera) and a lens body 400 (a lens barrel). This configuration is the same as that of the camera system of Embodiment 1 illustrated in FIG. 2, except for the configuration of the camera CPU 301 and the lens CPU 401. Therefore, the descriptions of the same configuration as that of Embodiment 1 will be omitted.

In the camera CPU 301 of the present embodiment, a lens property information memory 312 in which the AF sensitivity error information and the drive limit information that are changed in accordance with a focal length for each lens are stored is provided. The AF sensitivity error information and the drive limit information are readout by the lens property information memory 312 based on the lens identification information and the focal length information inputted from the side of the lens body 400 to determine the second in-focus determination width. An output unit 408 in the lens CPU 401 outputs the focal length information detected by the focal length detector 206 and the identification information (the ID information) of the lens body 400 to the side of the camera body 300.

Figure 6:
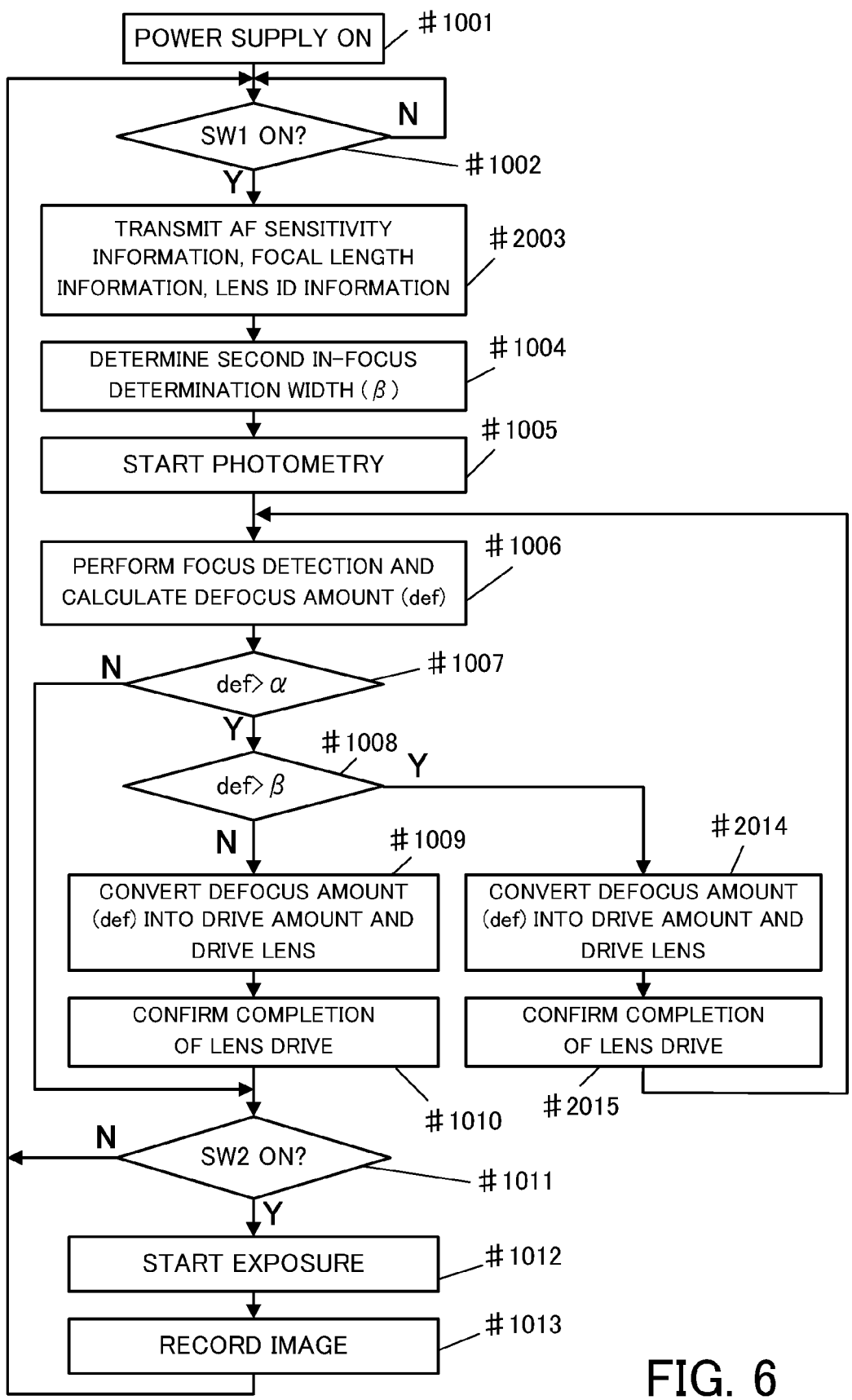
FIG. 6 is a flowchart illustrating a main operation of the camera system in Embodiment 3.

FIG. 6 is a flowchart illustrating a main operation by the camera system of FIG. 5. The flowchart of FIG. 6 is the same as that of Embodiment 1, except that Step #2003 is provided instead of Step #1003 of Embodiment 1 illustrated in FIG. 3. Therefore, the descriptions other than Step #2003 will be omitted.

When the camera CPU 301 determines that the signal of the first stroke switch SW1 of the release switch 104 is generated, in Step #2003, the focal length information and the lens identification information are communicated from the output unit 408 of the lens CPU 401 to the side of the camera body 300. The camera CPU 301 reads out the AF sensitivity error information and the drive limit information by the lens property information memory 312 based on the identification information (the ID information) and the focal length information of the lens body 400 inputted from the lens CPU 401. Then, it determines the second in-focus determination width β for determining whether or not the focus detection is performed again after driving the lens.

Thus, in the present embodiment, the camera CPU 301 (the controller) stores a plurality of drive limit values related to each of the plurality of lenses, and selects a specific drive limit value from the plurality of drive limit values based on the ID information of the lens (the information obtained from the lens).

Each of Embodiments 1 to 3 described above determines the second in-focus determination width β using both the AF sensitivity error information and the lens drive limit information, but it is not limited to this. The second in-focus determination width β may also be determined based on only one of the AF sensitivity error information or the lens drive limit information. For example, when it is determined only by using the AF sensitivity error information, the second in-focus determination width β is determined by a value obtained by dividing the first in-focus determination width α that is a reference in the camera by the AF sensitivity error. When it is determined only by using the lens drive limit information, the lens drive limit value is determined as the second in-focus determination width β.

According to each of the above embodiments, a lens-interchangeable camera that is capable of setting a clearance in-focus determination width which is optimal for each lens and that balances the improvement of the focusing precision and the reduction of the hunting generation to perform the focus control can be provided. In addition, a lens barrel that is interchangeably mounted on the lens-interchangeable camera of each of the above embodiments and a program by which a computer executes the method of each of the above embodiments can also be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-113841, filed on May 18, 2010, which is hereby incorporated by reference herein in its entirety.

What is claimed is:

1. A lens-interchangeable camera comprising:
a focus detector configured to perform focus detection; and
a controller configured to perform a drive control of a lens based on a defocus amount detected by the focus detector,
wherein the controller finishes focusing operation without driving the lens when the defocus amount is in a range of a first in-focus determination width of the lens, and performs the focusing operation when the defocus amount is out a range of the first in-focus determination width,
wherein the controller finishes the focusing operation without performing the focus detection again after completing the drive of the lens when the defocus amount is in a range of a second in-focus determination width of the lens, and performs the focus detection again after completing the drive of the lens when the defocus amount is out a range of the second in-focus determination width, and
wherein the second in-focus determination width is set so as to be greater than the first in-focus determination width and to be greater than or equal to a drive limit value of the lens based on information obtained from the lens.

2. The lens-interchangeable camera according to claim 1,
wherein the controller sets the second in-focus determination width to a first value when the drive limit value of the lens is greater than a first predetermined value, and sets the second in-focus determination width to a second value that is less than the first value when the drive limit value is less than or equal to the first predetermined value.

3. The lens-interchangeable camera according to claim 1,
wherein the controller sets the second in-focus determination width to the first value when AF sensitivity error of the lens is greater than the first predetermined value and the drive limit value of the lens is greater than a second predetermined value,
wherein the controller sets the second in-focus determination width to the second value that is less than the first value when the AF sensitivity error is greater than the first predetermined value and the drive limit value is less than or equal to the second predetermined value, and
wherein the controller sets the second in-focus determination width to the first value when the AF sensitivity error is less than or equal to the first predetermined value.

4. The lens-interchangeable camera according to claim 1,
wherein the information is ID information of the lens, and
wherein the controller stores a plurality of drive limit values related to each of a plurality of lenses, and selects a specific drive limit value from the plurality of drive limit values based on the ID information of the lens.

5. A lens barrel configured to be interchangeably mounted on a lens-interchangeable camera, the lens-interchangeable camera comprising:
a focus detector configured to perform focus detection; and
a controller configured to perform a drive control of a lens based on a defocus amount detected by the focus detector,
wherein the controller finishes focusing operation without driving the lens when the defocus amount is in a range of a first in-focus determination width of the lens, and performs the focusing operation when the defocus amount is out a range of the first in-focus determination width,
wherein the controller finishes the focusing operation without performing the focus detection again after completing the drive of the lens when the defocus amount is in a range of a second in-focus determination width of the lens, and performs the focus detection again after completing the drive of the lens when the defocus amount is out a range of the second in-focus determination width, and
wherein the second in-focus determination width is set so as to be greater than the first in-focus determination width and to be greater than or equal to a drive limit value of the lens based on information obtained from the lens.

* * * * *